Patented May 29, 1945

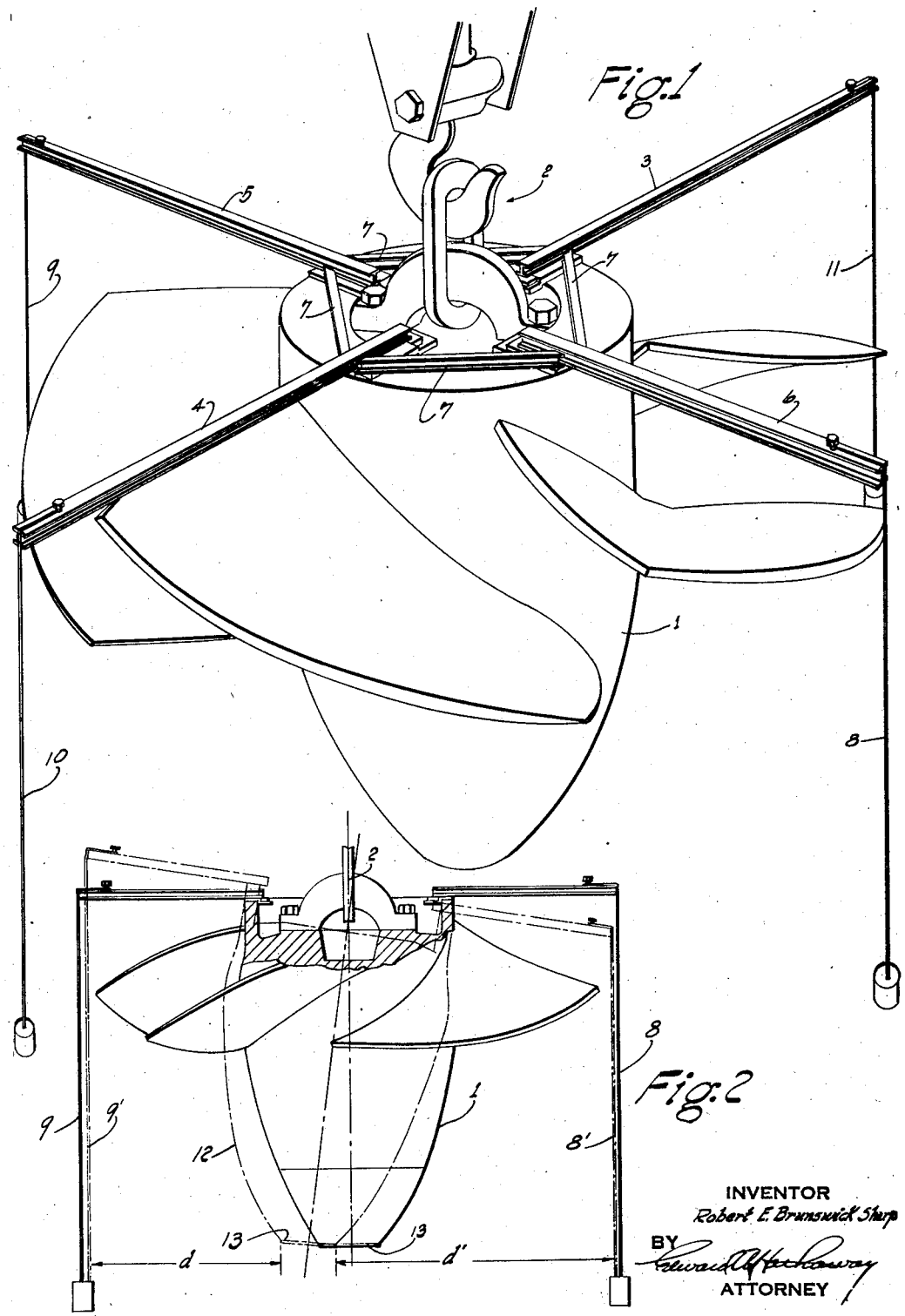

2,377,045

UNITED STATES PATENT OFFICE 2,377,045

BALANCE TESTING APPARATUS

Robert E. Brunswick Sharp, Philadelphia, Pa., assignor to The Baldwin Locomotive Works, a corporation of Pennsylvania Application July 8, 1943, Serial No. 493,956

1 Claim. (Cl. 73—66)

This invention relates generally to apparatus for balancing relatively large rotors such as runners for pumps, turbines or other desired elements.

It is an object of my invention to provide an improved and simplified apparatus for testing the static balance of rotors in a simple and direct manner with a high degree of accuracy.

Other objects and advantages will be more apparent to those skilled in the art from the following description of the accompanying drawing in which:

Fig. 1 is a perspective view of a runner with my improved balancing apparatus applied thereto; and Fig. 2 diagrammatically illustrates the operation of my improved balancing apparatus.

In the particular embodiment of the invention such as is disclosed herein for the purpose of illustrating one specific form among possible others that the invention might take in practice, I have shown my invention as applied to a pump or turbine runner 1 specifically of the propeller type, although my invention is applicable to other forms of runners and objects to be statically balanced. The runner is supported in any suitable manner such as by a crane hook and link generally indicated at 2 whereby the runner may tilt in whichever direction unbalance occurs. To determine the extent and direction of unbalance I provide preferably two pairs of diametrically opposed arms 3, 4, 5 and 6 suitably supported on top of the hub 1 and held in diametric alignment and preferably at right angles to each other by suitable struts such as 7. Each arm is provided with a plumb-bob 8, 9, 10 and 11, two of which are shown in Fig. 2 at 8 and 9. The arms are of equal length with respect to the runner axis and may, if desired, be formed as an integral unit centrally supported on top of the hub.

In operation, the arms 3—6 will be positioned on the hub so as to extend equal distances from the center thereof whereupon the plumb-bobs 8—11 will be hung over the ends of the arms. If the hub is out of balance so that it tilts to the dotted line position 12, Fig. 2, then the distance $d$ from the dotted line position 9' of plumb-bob 9 to a given point on the hub such as a coaxial annular shoulder 13 will be less than the corresponding distance $d'$ from such annular surface to the dotted line position 8' of plumb-bob 8. The distances $d$ and $d'$ specifically measured to the annular shoulder are in effect a measurement to the center of the runner and this expression broadly includes either an actual measurement to the center or to the annular surface. The two distances $d$ and $d'$ can be readily measured and their difference for even a small unbalance will be easily detectable inasmuch as one distance is diminished and the other is increased for any given unbalance thus giving a cumulative sensitivity or effect. Therefore, any unbalanced effect is considerably magnified in the measurements. Metal is removed from or added to any desired or appropriate part of the rotor to bring the same into balance and the distances $d$ and $d'$ for each of the four plumb-bobs may be frequently measured during the balancing operation until all of such distances are equal whereupon the runner is then in balance.

From the foregoing disclosure it is seen that I have provided an extremely simple and yet highly effective apparatus for balancing objects particularly relatively large runners for hydraulic turbines, pumps and the like.

It will of course be understood that various changes in details of construction and arrangement of parts may be made by those skilled in the art without departing from the spirit of the invention as set forth in the appended claim.

I claim:

Apparatus for determining the unbalance of a stationary object which is freely pivotally hung from a support, comprising a pair of plumb bobs disposed at substantially diametric points of the object, a frame having radial arms from whose outer ends the plumb bobs are hung, said frame also being provided with a central portion having an opening through which the pivotal support extends so as to allow the frame to be seated on top of the object, and means adapted to be engageable with said object for centering said frame on said object substantially coaxial thereof so that the plumb bobs are located at substantially equal distances from the vertical axis of the frame whereby any unbalance of the object is indicated by unequal distances between the respective plumb bobs and said vertical axis.

ROBERT E. BRUNSWICK SHARP.